Patented May 12, 1953

2,638,411

UNITED STATES PATENT OFFICE 2,638,411

WAX COMPOSITION

Warren L. Thompson, Robert W. Provine, and John V. Lawson, Tulsa, Okla., assignors to Mid-Continent Petroleum Corporation, Tulsa, Okla., a corporation of Delaware No Drawing. Application October 8, 1945, Serial No. 621,164

1 Claim. (Cl. 44—7.5)

This invention relates to wax compositions. Ordinary wax products including candles change their shapes when exposed to high temperatures. Candles are subject to undesirable bending at high temperatures, and other wax products are deformed at such temperatures.

In making wax mixtures for candles and other articles, the usual practice consists in adding stearic acid to a wax, so as to impart strength to the wax product. For example, candles containing stearic acid will not bend as much as those made without the use of stearic acid. However, this stearic acid is an expensive ingredient, and various attempts have been made to accomplish the desired results without resorting to the high cost involved in the usual commercial practice.

Our study of this subject has led to special cooperative details which very economically accomplish the desired results.

Briefly stated, we combine microcrystalline wax with an eutectic palmitic-stearic acid mixture and a much larger volume of the wax to be treated. Comparative results actually accomplished by this inexpensive mixture will be herein set forth.

The palmitic-stearic eutectic mixture may be approximately as follows:

Palmitic acid about 67%,
Stearic acid about 29%,
Oleic acid about 4%.

In this example, the inexpensive palmitic acid is approximately two-thirds of the eutectic mixture. An eutectic mixture of this kind is combined with other cooperative conditions found in the present invention wherein microcrystalline wax is added for an economical solution of the perplexing problem. We combine the microcrystalline wax with the eutectic mixture to produce an unexpected improvement.

The use of expensive stearic acid alone compared with our relatively inexpensive use of the above-mentioned eutectic mixture and microcrystalline wax appear as follows:

| Composition of Stearic Acid Candle | Blend to Equal Stearic Acid Candle |
|---|---|
| 10% Stearic acid. 90% Paraffin wax. | 5% Eutectic mixture. 1% Microcrystalline wax. 94% Paraffin wax. |
| 20% Stearic acid. 80% Paraffin wax. | 12% Eutectic mixture. 1% Microcrystalline wax. 87% Paraffin wax. |
| 30% Stearic acid. 70% Paraffin wax. | 21% Eutectic mixture. 1% Microcrystalline wax. 78% Paraffin wax. |

This example resulting from actual tests, clearly shows very substantial advantages of the inexpensive new composition. In each of the foregoing tests the original wax had an ASTM melting point of 125°–127° F. However, this specific illustration is merely intended to definitely point out the economy actually found in various different blends, without limiting the invention to the melting point of the original wax.

In commercial practice the percentages will, of course, be varied for most effective results in hardening the wax to be treated. We have referred to about 1% of the microcrystalline wax, which cooperates with the eutectic mixture, but our tests have shown that there is no disadvantage in using much larger percentages of this crystalline wax for cooperation with the eutectic mixture.

While the invention is not limited to specific percentages, except as specified in the claim, it is to be understood that the inexpensive paraffin wax has a much larger volume than all of the added materials combined, and that these added materials may be considerably less than 25% of the wax composition.

The strength of candles and other wax articles can be increased by increasing the quantity of said eutectic ingredient, or increasing the percentage of microcrystalline wax, or by increasing the quantities of both ingredients.

We claim:

A hardened paraffinic wax composition comprising an eutectic mixture of about 67% palmitic acid, about 29% stearic acid, and about 4% oleic acid, the quantity of said eutectic mixture being between about 5% and about 21% of the composition, microcrystalline wax amounting to at least 1% of the composition, and a relatively large volume of paraffin wax hardened by said eutectic and microcrystalline ingredients, the quantity of said paraffin wax being more than 75% of the hardened composition.

WARREN L. THOMPSON.
ROBERT W. PROVINE.
JOHN V. LAWSON.

References Cited in the file of this patent

UNITED STATES PATENTS

| Number | Name | Date |
|---|---|---|
| 735,538 | Lewy | Aug. 4, 1903 |
| 2,361,582 | Adams | Oct. 31, 1944 |

FOREIGN PATENTS

| Number | Country | Date |
|---|---|---|
| 157,402 | Germany | May 30, 1902 |

OTHER REFERENCES

Journal Petroleum Institute, March 1944, vol. 30, #243, pages 66 and 67 of article by Gray on Petroleum Waxes.

Lewkowitsch—Chemical Technology and Analysis of Oils, Fats, and Waxes—vol. III, 1915, pages 396—398.

Warth: Chemistry and Technology of Waxes, Reinhold Publishing Company, 1947, pages 308, 310 and 313.